(12) United States Patent
Barekar et al.

(10) Patent No.: US 11,025,131 B2
(45) Date of Patent: Jun. 1, 2021

(54) ADAPTOR FOR GENERATOR

(71) Applicant: Cummins Generator Technologies Limited, Peterborough (GB)

(72) Inventors: Swapnil Shankarrao Barekar, Maharashtra (IN); Rahul Balu Mule, Maharashtra (IN)

(73) Assignee: Cummins Generator Technologies Limited, Peterborough (GB)

( * ) Notice: Subject to any disclaimer, the term of this patent is extended or adjusted under 35 U.S.C. 154(b) by 519 days.

(21) Appl. No.: 15/743,586

(22) PCT Filed: Jul. 11, 2016

(86) PCT No.: PCT/GB2016/052091
§ 371 (c)(1),
(2) Date: Jan. 10, 2018

(87) PCT Pub. No.: WO2017/009626
PCT Pub. Date: Jan. 19, 2017

(65) Prior Publication Data
US 2018/0205286 A1    Jul. 19, 2018

(30) Foreign Application Priority Data

Jul. 14, 2015 (GB) .................................. 1512264

(51) Int. Cl.
*H02K 7/00* (2006.01)
*H02K 7/18* (2006.01)
(Continued)

(52) U.S. Cl.
CPC ........... *H02K 7/003* (2013.01); *F02B 63/042* (2013.01); *F16B 5/02* (2013.01); *H02K 7/1815* (2013.01); *F16B 2200/506* (2018.08)

(58) Field of Classification Search
CPC ........ F02B 63/00; F02B 63/04; F02B 63/042; F16B 5/02; F16B 2200/503;
(Continued)

(56) References Cited

U.S. PATENT DOCUMENTS 4,010,377 A   3/1977  McKenzie
5,258,675 A * 11/1993 Nelessen ................ H02K 7/003
                                                  310/91
(Continued)

FOREIGN PATENT DOCUMENTS

CN    203978553    12/2014
DE    43 04 630    8/1994
EP    2 573 414    11/2017

OTHER PUBLICATIONS

International Search Report and Written Opinion for International Application No. PCT/GB2016/052091, dated Oct. 20, 2016, 13 pages.
(Continued)

*Primary Examiner* — Josh Skroupa
(74) *Attorney, Agent, or Firm* — Foley & Lardner LLP

(57) ABSTRACT

An adaptor for connecting a generator to a prime mover. The adaptor includes a first flange member for connection to the prime mover, a second flange member for connection to the generator, and a plurality of angled cross members between the first and second flange members. By providing a plurality of angled cross members between the first and second members, the adaptor may use less material for a given stiffness.

15 Claims, 9 Drawing Sheets

(51) Int. Cl.
*F02B 63/04* (2006.01)
*F16B 5/02* (2006.01)

(58) Field of Classification Search
CPC .. F16B 2200/506; F16C 35/045; F16D 3/841; H01R 27/00; H01R 31/06; H02K 7/003; H02K 7/1815; H02K 2213/03; Y10T 403/3981; Y10T 403/642; Y10T 403/645
USPC .......................... 403/199, 336, 337; 464/170
See application file for complete search history.

(56) References Cited

U.S. PATENT DOCUMENTS

| | | | |
|---|---|---|---|
| 6,094,797 A | 8/2000 | Sherman | |
| 9,399,948 B2 * | 7/2016 | Huettlin | F01C 9/002 |
| 9,843,238 B2 * | 12/2017 | Wilson | H02K 7/1815 |
| 9,932,857 B2 * | 4/2018 | Noel | F16C 35/045 |
| 2013/0076213 A1 | 3/2013 | McCloud et al. | |
| 2014/0346780 A1 | 11/2014 | Holder | |

OTHER PUBLICATIONS

Search Report for GB Application No. 1512264.1, dated Jan. 13, 2016, 4 pages.

* cited by examiner

ADAPTOR FOR GENERATOR

The present invention relates to an adaptor for connecting a generator to a prime mover in a power generation system.

Power generation systems typically comprise a prime mover connected to a generator. For example, a power generating set may comprise an internal combustion engine, such as a diesel engine, coupled to a generator, such as an alternator. In operation the prime mover is used to drive the generator, in order to generate the output power. This is achieved by mechanically connecting rotating parts of the prime mover and the generator. An adaptor may be used to connect non-rotating parts, in order to prevent movement between the prime mover and the generator.

Existing adaptors are usually formed from a single cast piece of metal. Openings or windows are provided in the adaptor to allow an operator to connect the rotating parts. However this makes the adaptor difficult to cast, and requires the use of a core in the casting process. This in turn increases the cost and complexity of manufacture.

It has also been found that the openings in existing adaptor designs may only provide a limited space for the operator to connect the rotating parts, leading to an increased assembly time. If an attempt were made to increase the size of the openings, then this would reduce the stiffness of the adaptor, and increase the risk of defects arising during the casting process.

Furthermore, existing adaptor designs tend to require a relatively large amount of material in order to achieve the required stiffness. This makes the adaptor heavy, thereby adding to the overall weight of the power generation system, and adds to the cost of manufacture.

In addition, the presence of openings in the adaptor can lead to a fairly high amount of fan noise, with a consequential negative impact on the operating environment.

An example of a known adaptor is disclosed in US 2014/0346780, the subject matter of which is incorporated herein by reference.

According to a first aspect of the present invention there is provided an adaptor for connecting a generator to a prime mover, the adaptor comprising:
 a first flange member for connection to the prime mover;
 a second flange member for connection to the generator; and
 a plurality of angled cross members between the first and second flange members.

The present invention may provide the advantage that, by providing a plurality of angled cross members between the first and second members, it may be possible to provide an adaptor which uses less material for a given stiffness. This in turn may lead to a reduction in weight and a reduction in cost of production. It has also been found that the use of angled cross members may allow an increase the size of the openings for connecting the rotating parts, thereby facilitating assembly. Furthermore, the adaptor may be easier to cast. For example in certain configurations it may be possible to cast the adaptor without the need for a core. In addition, it has been found that the use of angled cross members may reduce the amount of fan noise which is generated.

The cross members are preferably angled with respect to a line lying parallel to the axis of the generator to which the adaptor is to be connected. Thus, rather than lying parallel to the axis of the generator, the cross members may lie at an angle to a notional line running parallel to the axis. Preferably the angle is such that one end of a cross member is offset circumferentially with respect to the other end. This may help to ensure that the adaptor has the required stiffness.

Preferably the adaptor is arranged to be bolted to the prime mover and/or the generator. Thus the first flange member may comprise bolt holes for bolting the flange member to a part of the prime mover and/or the second flange member may comprise bolt holes for bolting the second flange member to a part of the generator. The bolt holes may be cast, or machined in the adaptor after casting, or formed in any other way.

Preferably the ends of the cross members are adjacent to bolt holes in the first flange member and/or the second flange member. For example, a cross member may extend between a location adjacent to a bolt hole in the first flange member and a location adjacent to a bolt hole in the second flange member. This may allow connections to be provided between load points and reaction points, thus allowing an effective transfer of force through the adaptor to be achieved using a minimum amount of material.

In a preferred embodiment the cross members are provided in pairs. For example, a distance between two cross members of a pair may be less than that between two adjacent pairs of cross members. Arranging the cross members in pairs may allow an opening to be provided between adjacent pairs, thereby providing access to the rotating parts, and may help with bracing between the first and second flange members.

Preferably the cross members of a pair are at an angle to each other. For example, one cross member of a pair may be angled in the opposite direction to the other cross member of the pair. Thus, one cross member may be angled in one direction with respect to a line lying parallel with the axis of the generator, and the other cross member of the pair may be angled in the opposite direction. This may help to ensure that the adaptor has the required stiffness.

In one embodiment, the cross members of a pair are angled by a substantially equal but opposite amount, with respect to a line lying parallel with the axis of the generator. In this case each of the cross members may have substantially the same length. However other arrangements are also possible, and the cross members may be angled by different amounts and/or have different lengths.

The cross members in a pair may be spaced further apart on one side of the adaptor than on the other. For example, the cross members of a pair may be spaced further apart on the side of the adaptor where they meet the first flange member than on the side of the adaptor where they meet the second flange member (or vice versa). This may help to achieve a required stiffness.

In one embodiment the cross members of a pair are spaced apart on one side of the adaptor, and are adjacent to each other on the other side of the adaptor. Thus a pair of cross members may be V-shaped. In this case the base of the V may be connected to the second flange member, and the ends of the V may be connected to the first flange member (or vice versa). This may provide a rigid arrangement, whereby a desired stiffness can be achieved with minimal use of material.

Alternatively the cross members of a pair may be provided in other configurations, such as an X-shaped configuration or a Y-shaped configuration, or configurations in which the two cross members do not touch, or a combination of configurations.

Preferably the cross members of a pair have first ends located adjacent to separate bolt holes in the first flange member, and second ends located adjacent to the same bolt hole in the second flange member. For example, where a pair of cross members is V-shaped, the base of the V may be adjacent to a bolt hole in the second flange member, while the ends of the V may be adjacent to separate bolt holes in the first flange member. This may allow connections to be provided between load points and reaction points, thus allowing an effective transfer of force through the adaptor to be achieved using a minimum amount of material.

Preferably the adaptor is arranged such that a bolt hole in the second flange member lies circumferentially between two bolt holes in the first flange member. For example, the first flange member may have twice as many bolt holes as the second flange member, and each bolt hole in the second flange member may lie circumferentially between two bolt holes in the first flange member. Where such an arrangement of bolt holes is used, a V-shaped configuration of cross members may be particularly effective in transferring force through the adaptor using the minimum amount of material. However it will be appreciated that other arrangements of bolt holes are also possible, depending on the characteristics of the components which are to be connected.

In alternative embodiments, rather than arranging the cross members in pairs, the cross members may be spaced separately around the adaptor, or may be clustered, for example in a "bird's nest" type configuration (e.g. with multiple overlying cross members). In the latter case, openings may be provided between separate clusters. Combinations of the various different configurations may also be used.

Preferably the first flange member is substantially ring-shaped. The first flange member may comprise protrusions which extend radially outwards from the circumference of the first flange member, with bolt holes located in the protrusions. This may allow the first flange member to have a reduced diameter elsewhere (where there are no bolt holes). This in turn may help to reduce the amount of material used for the first flange member, and thus reduce the overall cost and weight of the adaptor.

Preferably the second flange member is substantially ring-shaped. The second flange member may comprise protrusions which extend radially outwards from the circumference of the second flange member, with bolt holes located in the protrusions. This may help to reduce the total amount of material used for the second flange member, thereby reducing the overall weight and cost of the adaptor.

Preferably the first and second flange member are substantially concentric, and/or spaced apart axially.

The adaptor is preferably provided with openings in order to allow an operator access to rotating parts. Thus openings may be provided between the cross members. The openings may extend in both an axial and a circumferential direction.

It has been found that, by providing angled cross members between the first and second members, it may be possible to provide larger openings than would otherwise be the case, thereby improving access to rotating parts and facilitating assembly. For example, where the cross members are provided in pairs, an opening may be provided between adjacent pairs. In this case an opening between two pairs of cross members may be larger than an opening between the cross members of a pair.

Preferably an opening between two pairs of cross members is wider on the second flange member (generator) side than on the first flange member (prime mover) side. This may facilitate an angled access to rotating parts, particularly those on the prime mover side of the adaptor such as a coupling disc.

The opening may extend partially in a radial direction. This may be achieved for example by arranging the diameter of the first flange member to be larger than the diameter of the second flange member (or vice versa). This may allow access to the rotating parts through the opening to be at a more acute angle, which may facilitate assembly.

The cross members may be connected on a radially inwards side of the first flange member and/or a radially outwards side of the second flange member. For example, the cross members may connect to protrusions which extend radially outwards from the circumference of the second flange member, such as protrusions with bolt holes. This may allow the cross members to extend between the first and second flange members when the diameter of the first flange member is larger than that of the second flange member. Alternatively or in addition, the cross members may be inclined radially (that is, one end of the cross member may be radially outwards of the other end).

The first flange member and the second flange member may be arranged with a radial separation. Thus, when viewed axially, there may be a gap between the first flange member and the second flange member. This may allow the opening to extend partially in a radial direction, thereby facilitating access to rotating parts.

The adaptor may include a taper on the outer diameter of the second flange member. This may reduce the amount of material used for the second flange member, and thus may contribute to a reduction in the overall weight of the adaptor.

The second flange member may include pads on its inside surface at locations where the cross members meet the second flange member. The pads may be provided in locations where bolt holes are to be formed (e.g. cast or machined).

This may allow additional material to be provided only where needed, which may allow the thickness of the second flange member to be reduced elsewhere, thereby reducing the overall cost and weight of the adaptor.

It has been found that, where the cross members are provided in pairs, it may be possible to use less material in the first flange member in locations between the two cross members of a pair. Thus the first flange member may include a recess (or an area of reduced thickness) between two cross members of a pair. The recess may be provided, for example, on the radially inwards edge of the first flange member and/or elsewhere. This may reduce the amount of material used, thereby reducing the overall cost and weight of the adaptor.

Previously considered adaptor designs required a core to be used in the casting process. However it has been found that it may be possible to cast the present adaptor design without the need for a core. For example, recesses in the first flange member and/or a tapered design may facilitate flow of material through the mould during casting, which may allow the adaptor to be cast without a core. Thus the adaptor is preferably arranged to be cast without the need for a core. This may help to reduce the cost and complexity of the manufacturing process.

Many generators require a fan for cooling purposes. The fan may advantageously be located radially inwards of the adaptor. Thus the adaptor may be arranged to accommodate a fan.

Previously considered adaptor designs have led to fan noise being transmitted to the exterior through openings in the adaptor, with negative consequences for the working environment. It has been found pursuant to the present invention that this may be due at least in part to the relative positioning of the fan blade and the sides of the openings.

By providing angled cross members between the first and second flange members, a fan blade may intersect a cross member at a point which passes progressively along the edge of the cross member during rotation of the fan. Thus a cross member may present a progressive cutting edge to the blade of a fan. It has been found that this may lead to a reduction in fan noise, in comparison to the case where the fan blade intersects the edge of the opening instantaneously.

According to another aspect of the invention there is provided a power generation system comprising a prime mover, a generator, and an adaptor in any of the forms described above. Preferably a shaft (e.g. generator shaft) runs at least partially through the adaptor. A coupling plate may be provided for connecting the shaft to the prime mover. A fan may be located inside the adaptor, for example, mounted on the shaft.

Corresponding methods may also be provided. Thus according to another aspect of the invention there is provided a method of manufacturing an adaptor for connecting a generator to a prime mover, the method comprising producing an adaptor comprising:
- a first flange member for connection to the prime mover;
- a second flange member for connection to the generator; and
- a plurality of angled cross members between the first and second flange members.

The adaptor may be produced using any appropriate technique such as casting, machining, or a combination of the two. In a preferred embodiment the adaptor is at least initially cast, and the casting is performed without a core. The cast adaptor may subsequently be machined to produce the final adaptor.

In the present specification terms such as "radial", "axial", "circumferential" etc. are generally defined with reference to the axis of a generator and/or engine to which the adaptor is to be connected.

Features of one aspect of the invention may be provided with any other aspect. Apparatus features may be provided with method aspects and vice versa.

Preferred features of the present invention will now be described, purely by way of example, with reference to the accompanying drawings, in which.

OVERVIEW

Figure 1:
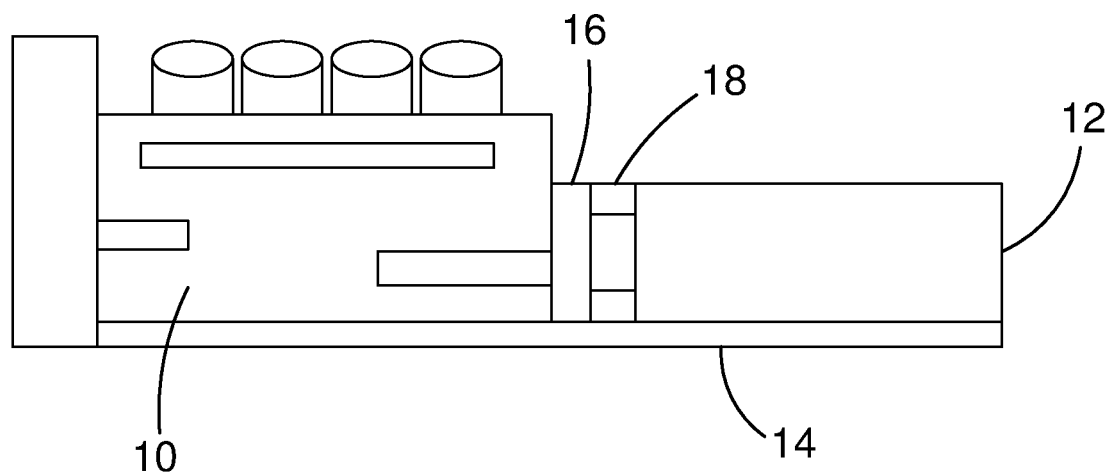
FIG. 1 shows schematically a generating set comprising an engine coupled to a generator.

FIG. 1 shows schematically a generating set comprising an engine 10 coupled to a generator (alternator) 12. The engine 10 is typically an internal combustion engine such as a petrol or diesel engine. The generator 12 may be any type of electrical generator, such as a synchronous generator or a permanent magnet generator. The engine 10 and generator 12 are both mounted on a bed frame 14. The crankshaft of the engine (not shown) is mechanically coupled to the rotor of the generator (not shown). In operation, mechanical energy produced by the engine 10 is transferred to the generator 12 in order to generate the electrical output.

In the arrangement of FIG. 1 the engine 10 comprises a flywheel located in a fly wheel housing 16. An adaptor 18 is used to connect the engine 10 to the generator 12. The adaptor 18 helps to prevent relative movement between the engine and the generator.

Figure 2:
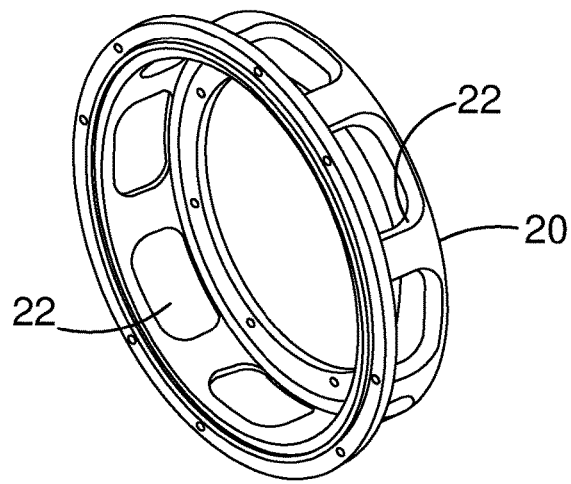
FIG. 2 shows a previously considered adaptor.

FIG. 2 shows a previously considered adaptor design for connecting a generator to an engine. Referring to FIG. 2, the adaptor 20 is generally cylindrical and is formed from a single cast piece of metal. Flanges at each end allow the adaptor to be bolted to the flywheel housing on one side and the generator on the other side. Openings 22 are provided in the adaptor. The openings 22 allow access to the interior of the adaptor, which allows an operator to connect the rotating parts once the generator has been brought into alignment with the engine.

Figure 3:
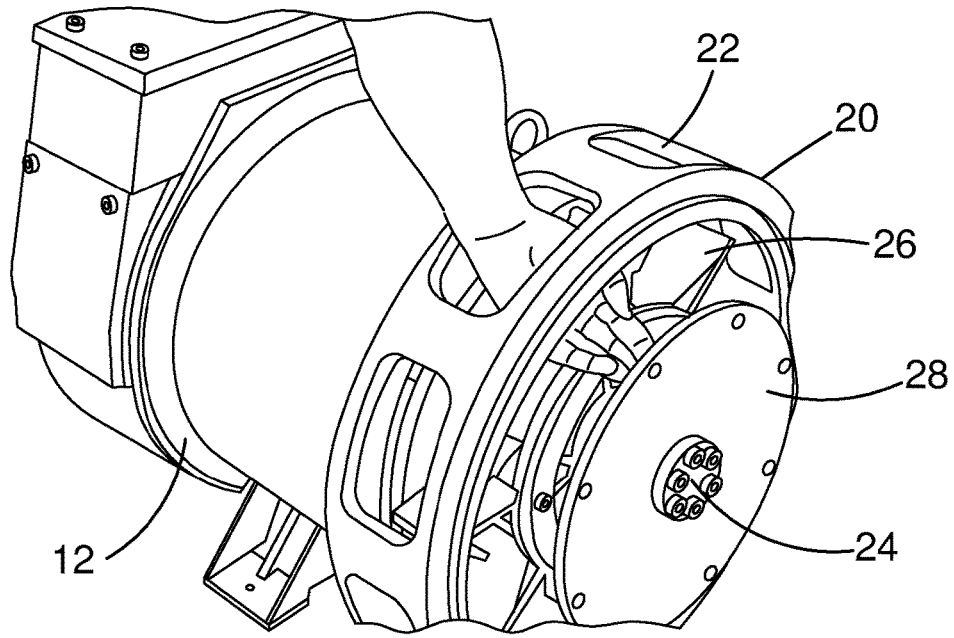
FIG. 3 shows parts of a partially assembled generator set.

FIG. 3 shows parts of a partially assembled generator set. Referring to FIG. 3, the partially assembled generator set comprises a generator 12 to which is attached an adaptor 20. The generator comprises a generator shaft 24 on which is mounted a fan 26 and a coupling plate 28. During assembly, the generator 12 and adaptor 20 are brought into alignment with the engine. As shown in FIG. 3, the openings 22 allow an operator to access to the coupling plate 28. This allows the operator to bolt the coupling plate 28 to the engine flywheel.

The previously considered adaptor shown in FIGS. 2 and 3 may be effective in ensuring a stiff connection between the generator and the engine. However various problems have been identified in the previously considered adaptor, as discussed below.

The adaptor shown in FIGS. 2 and 3 is cast from a single piece of metal. However the casting process requires a core, which increases the manufacturing cost and complexity.

As can be seen in FIG. 3, the openings 22 only provide a limited space for the operator to insert bolts in the coupling plate 28. If an attempt were made to increase the size of the openings, then this would reduce the stiffness of the adaptor, and increase the risk of defects arising during the casting process.

It has also been found that the adaptor of FIGS. 2 and 3 is relatively heavy, thereby adding to the overall weight of the generating set. It would also be desirable to reduce the overall amount of material used, in order to reduce the cost of manufacture.

Furthermore, it has been found that the openings 22 in the adaptor can lead to fan noise, with a consequential negative impact on the operating environment.

Adaptor Design

Embodiments of the present invention are directed to adaptor designs which may maximize the stiffness to weight ratio of the adaptor, simplify the casting process, provide greater access for an operator to connect rotating parts, and/or reduce fan noise, in comparison to previously considered designs.

Figure 4:
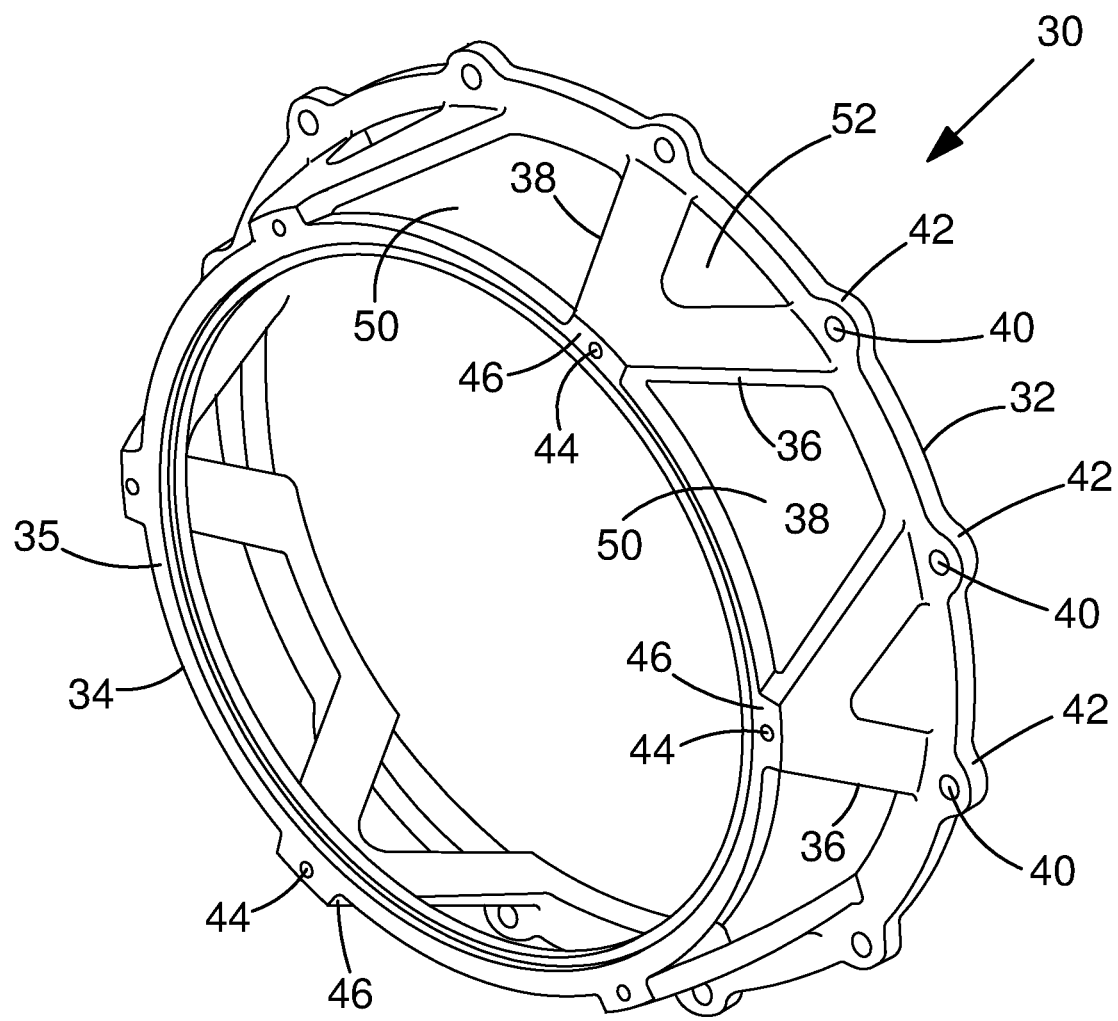
FIGS. 4 and 5 show an adaptor in an embodiment of the present invention.
Figure 5:
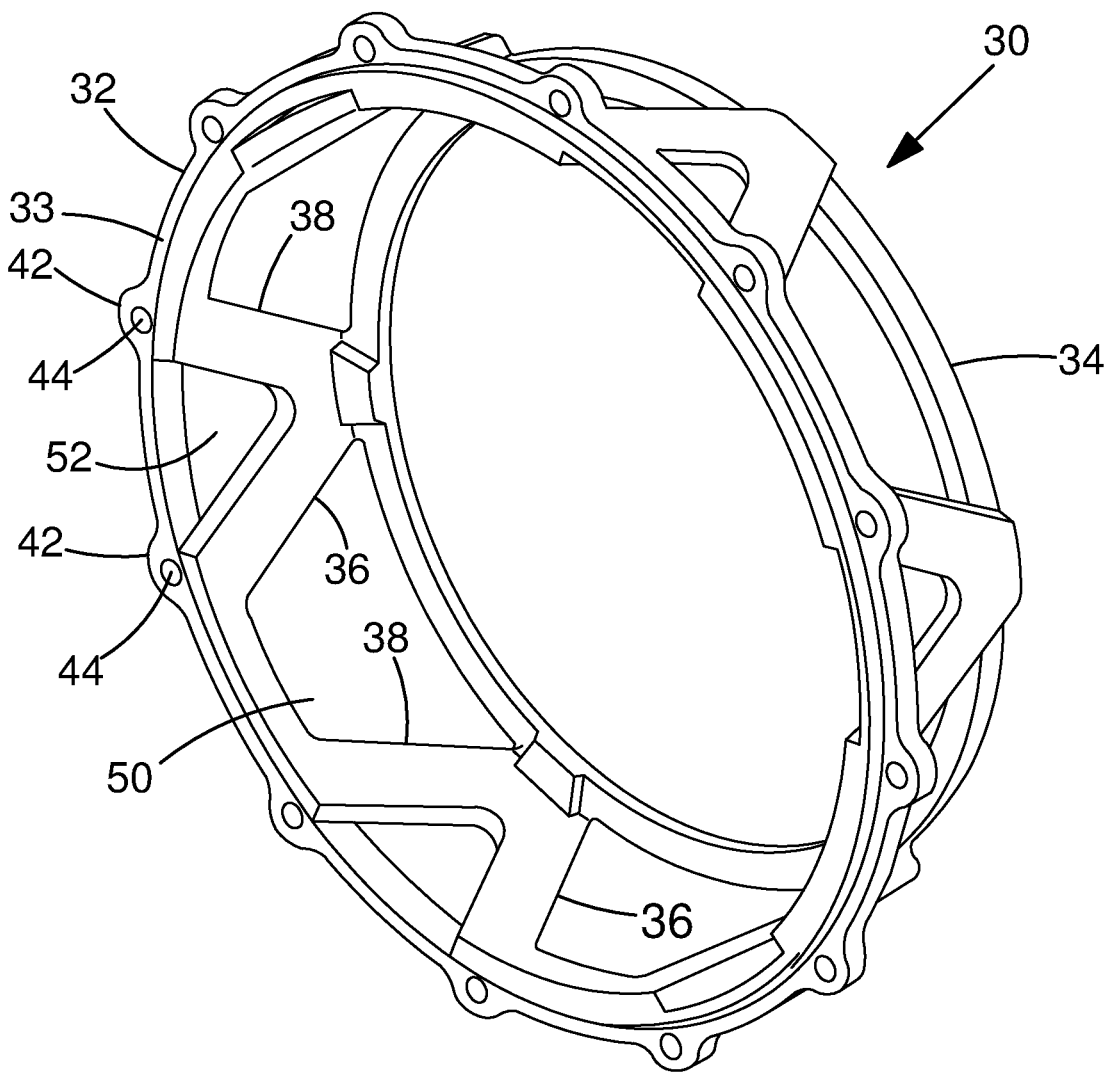

FIGS. 4 and 5 show an adaptor in an embodiment of the present invention for connecting a generator to an engine. FIG. 4 shows the adaptor from the generator side while FIG. 5 shows the adaptor from the engine side.

Referring to FIGS. 4 and 5, the adaptor 30 comprises a first flange member 32, a second flange member 34, and a number of cross members 36, 38. The first flange member 32 and the second flange member 34 are both essentially ring-shaped, with the flange member 32 having a radius which is larger than that of the second flange member 34. The first flange member 32 has a flat surface 33 which interfaces with a fly wheel housing. The second flange member 34 has a flat surface 35 which interfaces with a generator frame.

The first flange member 32 is provided with a number of bolt holes 40. The bolt holes 40 are located in protrusions 42 which extend radially outwards from the circumference of the first flange member 32. The second flange member 34 is provided with bolt holes 44. The bolt holes 44 are located in protrusions 46 which extend radially outwards from the circumference of the second flange member 34. The bolt holes 40 in the first flange member are arranged for connecting the adaptor 30 to a flywheel housing, while the bolt holes 44 in the second flange member 34 are arranged for connecting the adaptor 30 to a generator frame. The number and location of the bolt holes 40, 44 may be governed by standard requirements, such as SAE (Society of Automotive Engineers) standards. In this embodiment the first flange member 32 has 12 bolt holes and the second flange member 34 has 6 bolt holes, although of course the number of the bolt holes and their locations may be varied in dependence on the particular engine and generator to which the adaptor is to be connected.

In the arrangement of FIGS. 4 and 5, the cross members 36, 38 connect the first flange member 32 and the second flange member 34 in such a way that the first flange member and the second flange member are substantially concentric, but spaced apart axially. The cross members 36, 38 also maintain a small radial separation between the first and second flange members. This may be achieved at least in part by connecting each cross member 36, 38 to a radially inward part of the first flange member 32 and to a radially outward part of the second flange member 34. Furthermore, the cross members 36, 38 connect the first flange member 32 and the second flange member 34 in such a way that each bolt hole 44 in the second flange member 34 lies circumferentially between two bolt holes 40 in the first flange member 32.

Still referring to FIGS. 4 and 5, it can be seen that, rather than lying parallel to the axis of rotation of the generator, each cross member 36, 38 lies at an angle relative to the axis of rotation. Some cross members 36 are angled in one direction relative to the axis of rotation, while other cross members 38 are angled in the opposite direction relate to the axis of rotation. The cross members are grouped together in pairs, with each pair forming a "V" configuration. In this embodiment the base of a "V" is connected to the second flange member 34 in the vicinity of a bolt hole 44, while the ends of the "V" are connected to the first flange member 32 in the vicinity of bolt holes 40. The V-shaped cross member design results in a large opening 50 between two pairs of cross members, and a small opening 52 between two cross members of a pair.

During assembly of the generator set, the first flange member 32 is bolted to the engine's flywheel housing, and the second flange member 34 is bolted to the generator frame.

Figure 6:
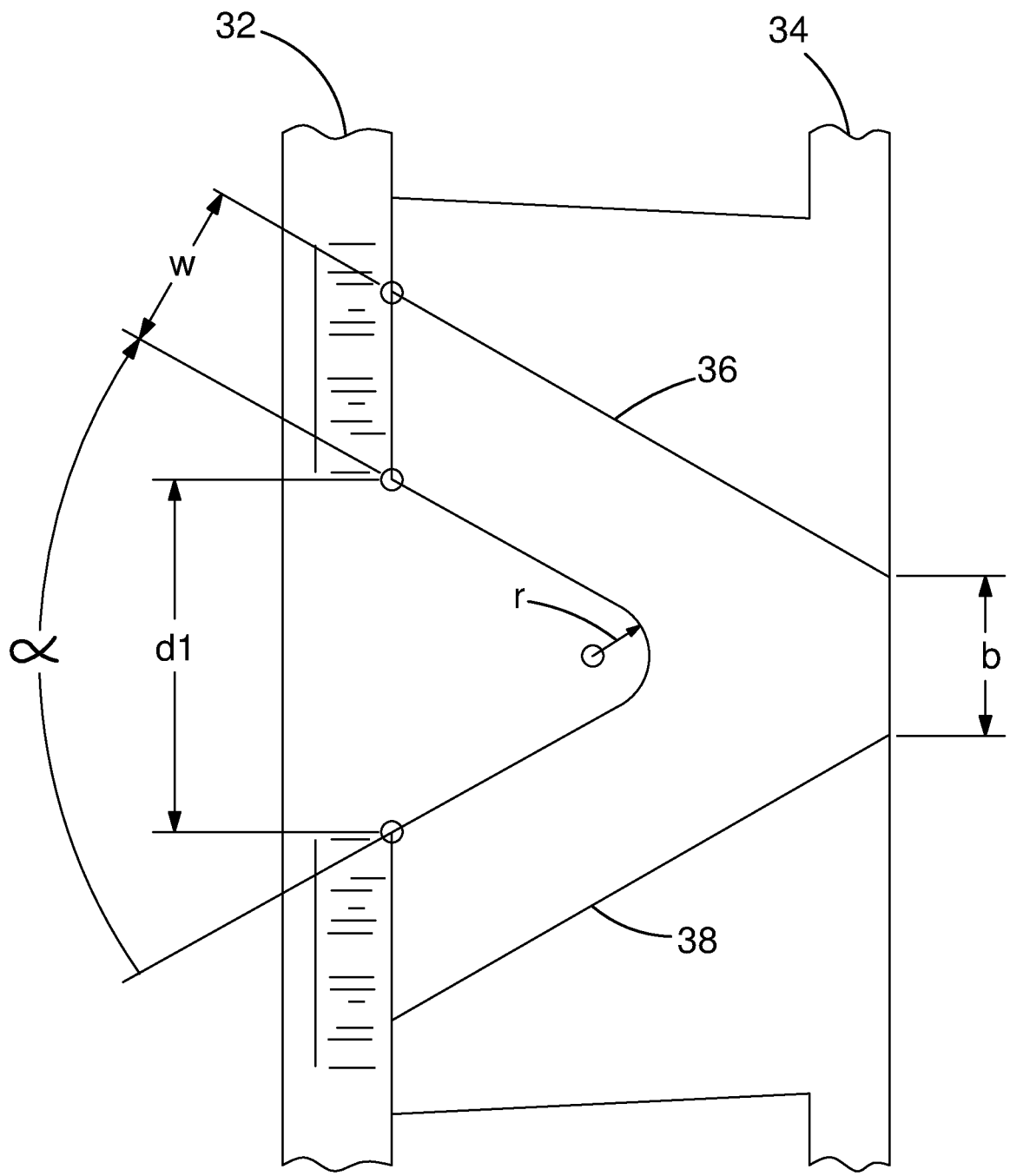
FIG. 6 is a top view of the adaptor of FIGS. 4 and 5.

FIG. 6 is a top view of the adaptor 30 showing a pair of cross members 36, 38. Referring to FIG. 6, the value of the angle α is typically between 40° and 70°. The width w of the cross members 36, 38 is typically between 20 mm and 35 mm. The width b of the base of the "V" is typically between 20 mm and 40 mm. The distance $d_1$ between two cross members at the point where they connect with the first flange member 32 is typically 50 mm to 70 mm. The radius of curvature r on the inside of the "V" is typically between 6 mm and 12 mm. Of course, any of these values may be varied, and different values may be used as appropriate.

Stiffness

Referring to FIGS. 4 and 5, it can be seen that the V-shaped design of the cross members provides a direct connection between the bolt holes 40 in the first flange member 32 and the bolt holes 44 in the second flange member 34. Thus this arrangement can allow an effective transfer of force from the engine mounting points to the generator mounting points, with a minimum distance between load point and reaction point. This can allow a required stiffness to be achieved using a minimum amount of material. Thus the overall amount of material can be reduced for a given stiffness, thereby reducing the cost of manufacture and reducing the weight of the generator set, in comparison to the previously considered adaptor design. For example in one embodiment, it has been found that the stiffness of the adaptor can be maintained or increased while reducing the amount of material by 50%.

Size of Window

Referring again to FIGS. 4 and 5, it can be seen that the V-shaped cross member design allows the size of the openings 50 between two adjacent pairs of cross members to be increased towards the second flange member 34. This allows increased hand room for an operator to couple the generator to the engine during assembly of the generator set. Furthermore the open cross member design provides greater visibility of the rotating components, thereby facilitating assembly. These features in turn help to reduce the assembly time and make the design more acceptable to the end user.

Figure 7C:
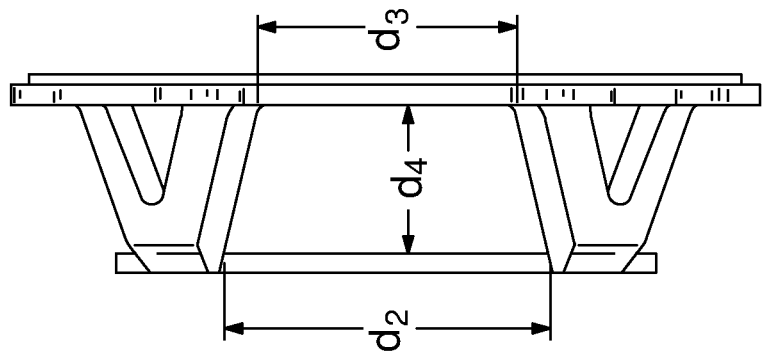
FIGS. 7A to 7C show side views of various adaptor designs.
Figure 7B:
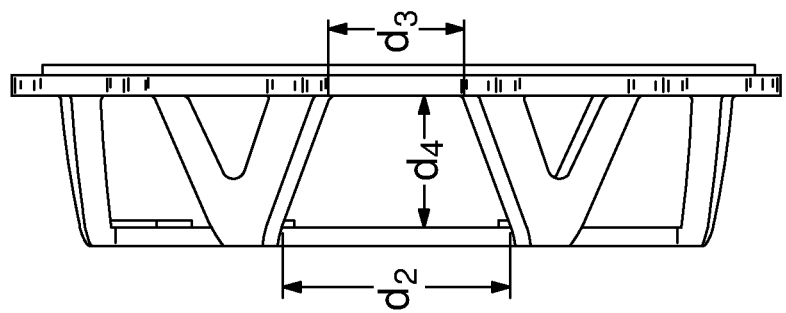
Figure 7A:
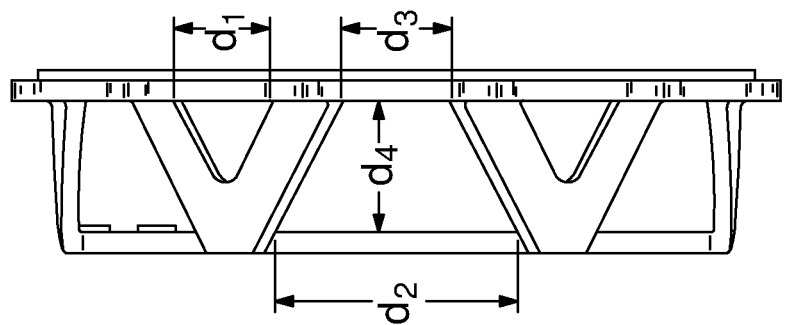

FIG. 7A shows a side view of the adaptor 30 in the embodiment of FIGS. 4 and 5. Referring to FIG. 7A, in this embodiment the distances $d_1$ and $d_3$ are each approximately 65 mm. However the distance $d_2$ between two adjacent pairs of cross members at their widest point (where they meet the second flange member) is approximately 138 mm. This allows a larger opening to be achieved than that in the previously considered adaptor design, thereby facilitating assembly of the generator set.

FIG. 7B shows a side view of an adaptor in another embodiment of the invention. In this embodiment the angle of the cross members is slightly less than that in the embodiment of FIG. 7A. The distance $d_3$ between two adjacent pairs of cross members at their narrowest point (where they meet the first flange member) is approximately 78 mm. The distance $d_2$ between two adjacent pairs of cross members at their widest point (where they meet the second flange member) is approximately 130 mm. Thus this arrangement can provide a wider opening near the first flange member.

FIG. 7C shows a side view of an adaptor in another embodiment of the invention. In this embodiment the pairs of cross members are spaced further apart. The distance $d_3$ between two adjacent pairs of cross members at their narrowest point (where they meet the first flange member) is approximately 130 mm. The distance $d_2$ between two adjacent pairs of cross members at their widest point (where they meet the second flange member) is approximately 164 mm. Thus this arrangement can provide a wider opening at the expense of reduced stiffness.

In each of FIGS. 7A to 7C the distance $d_4$ between the first flange member and the second flange member is approximately 75 mm.

It will be appreciated that the above dimensions are given by way of example only, and each of the values may be adjusted as appropriate to the circumstances.

Figure 8:
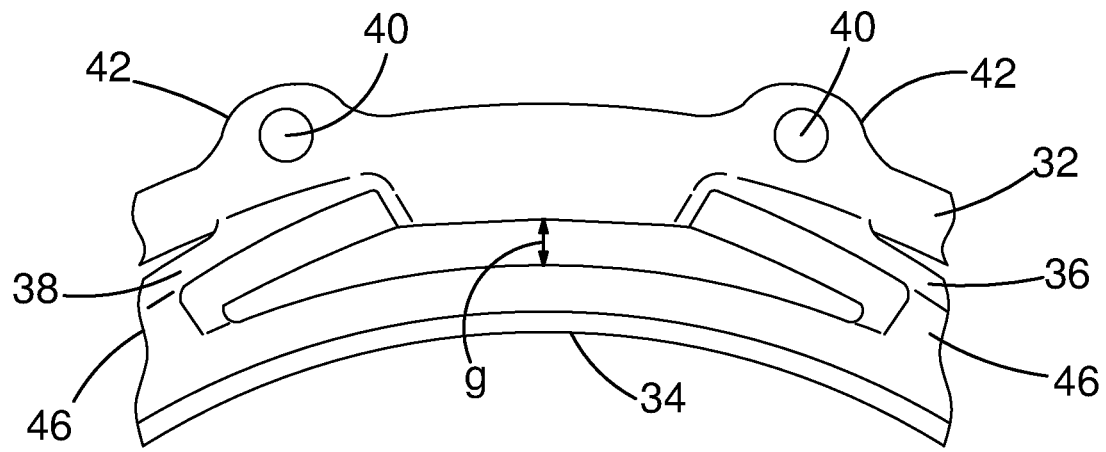
FIG. 8 shows an end view of part of the adaptor of FIGS. 4 and 5.

FIG. 8 shows an end view of part of the adaptor 30, viewed from the side of the second flange member 34. Referring to FIG. 8, it can be seen that the cross members 36, 38 maintain a small radial separation g between the first flange member 32 and the second flange member 34. This is achieved by connecting the cross members 36, 38 to a radially inward part of the first flange member 32 and a radially outward part of the second flange member 34. In this case the cross members 36, 38 are connected to the radial protrusions 46 on the second flange member 34. The cross members 36, 38 may also be inclined.

The radial separation g between the first and second flange members increases the size of the opening, leaving additional hand room for assembly. Furthermore, the smaller diameter of the second flange member allows access to the coupling plate at a more acute angle to the axis of the machine, thereby facilitating connection of the coupling plate to the engine.

Weight

As discussed above, the V-shaped cross member design can allow a required stiffness to be achieved using a minimum amount of material. This in turn can allow the weight of the adaptor to be reduced. Other features of the design also contribute to a reduction in the amount of material and hence a reduction in the weight, as discussed below.

Referring in particular to FIGS. 4, 5 and 8, it can be seen that the bolt holes 40 are provided in protrusions 42 which extend radially outwards from the perimeter of the first flange member 32. This can allow the first flange member 32 to have a reduced diameter for most of its circumference, with extra material only being provided where it is needed for the bolt holes 40. The addition of material only around the bolt holes can help to reduce amount of material used for the first flange member, and thus reduce the overall cost and weight of the adaptor.

Figure 9:
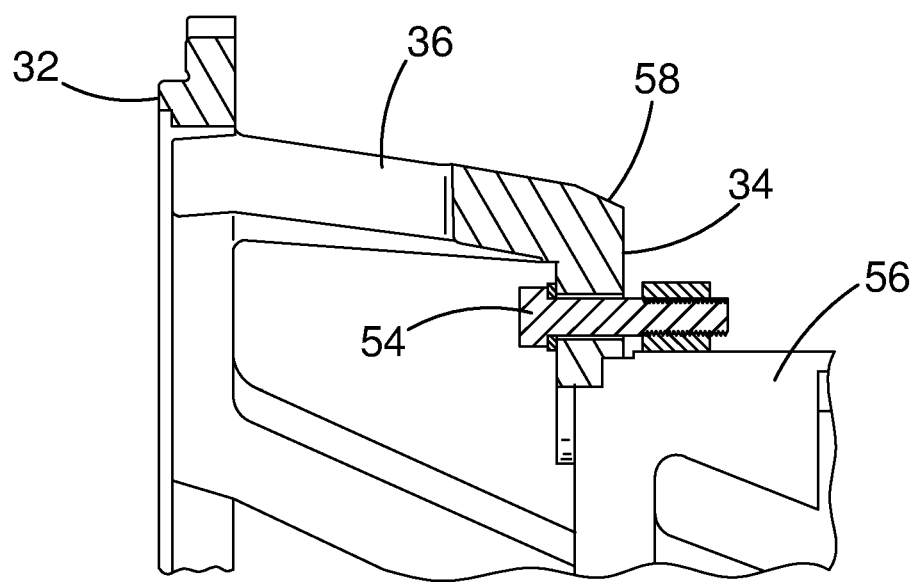
FIG. 9 shows a cross section through part of the adaptor of FIGS. 4 and 5.

FIG. 9 shows a cross section through part of the adaptor 30 at a point where it connects with the generator. A bolt 54 is used to connect the second flange member 34 with the generator frame 56. The adaptor includes a taper 58 on the outer diameter of the second flange member 34. The taper 58 reduces the amount of material used for the second flange member 34, and thus contributes to a reduction in the overall weight of the adaptor.

Figure 10:
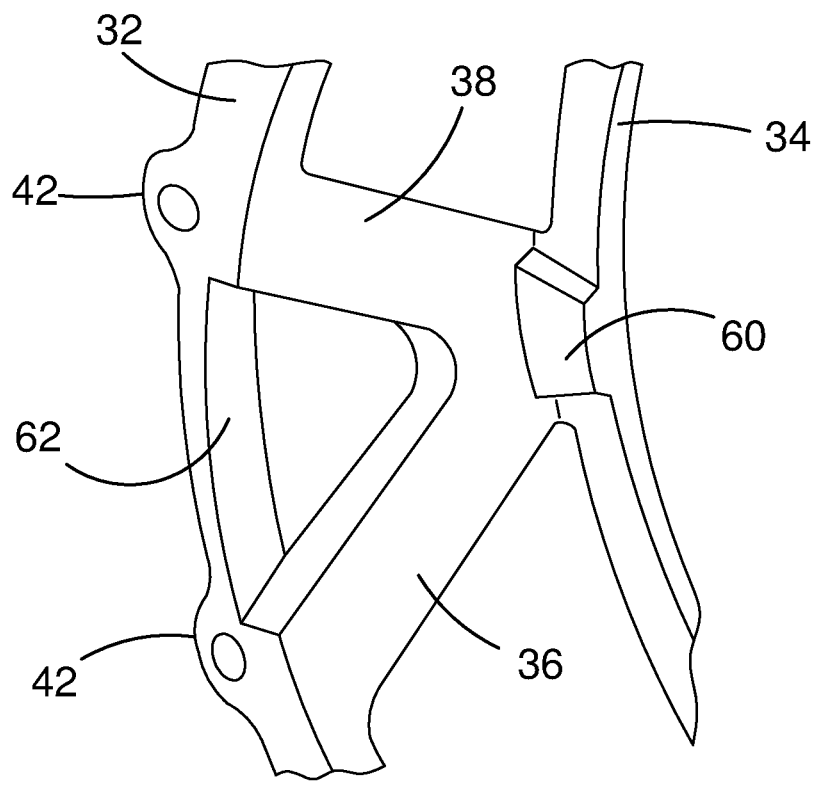
FIG. 10 shows part of the adaptor of FIGS. 4 and 5 viewed from the inside.

FIG. 10 shows part of the adaptor 30 viewed from the inside. Referring to FIG. 10, the second flange member 34 includes pads 60 on its inside surface at locations where the cross members 36, 38 meet the second flange member 34. The pads 60 are thus provided in locations where the bolt holes 44 are to be drilled. It has been found that, by providing the pads 60 only in locations where machining is expected, the thickness of the second flange member 34 can be reduced elsewhere. This can further reduce the overall cost and weight of the adaptor.

Figure 11:
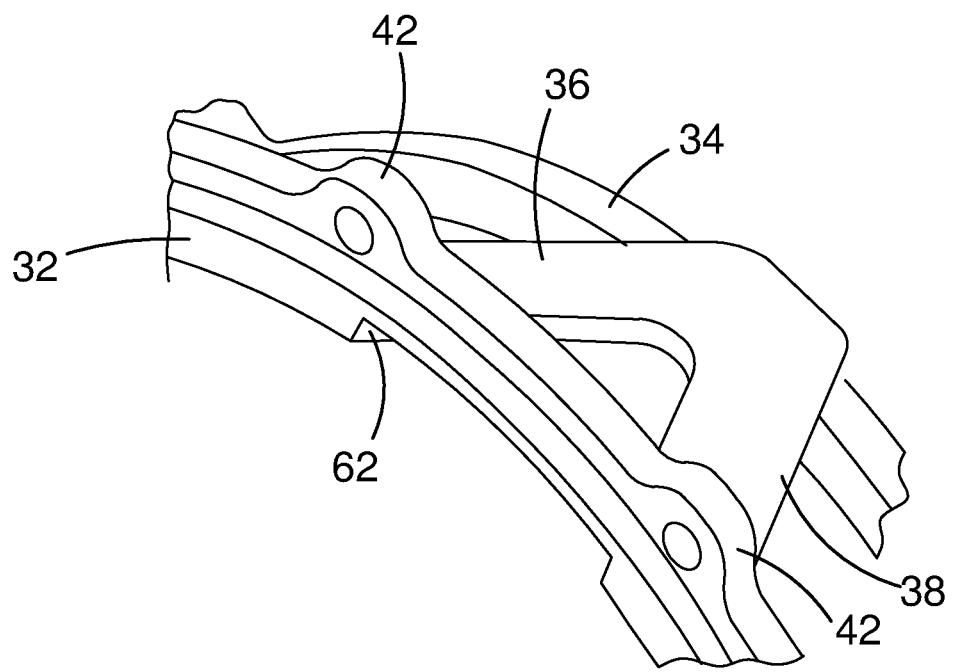
FIG. 11 shows an end view of part of the adaptor of FIGS. 4 and 5.

FIG. 11 shows an end view of part of the adaptor 30, viewed from the side of the first flange member 32. Referring to FIGS. 10 and 11, the first flange member 32 includes recesses or pockets 62 on its radially inwards edge between the points where two cross members 36, 38 of a pair meet the first flange member 32. It has been found that the V-shaped cross members 36, 38 help to strengthen the first flange member 32, and accordingly that less material need be used in locations between the two cross members. Thus provision of the recesses 62 can help to reduce the overall cost and weight of the adaptor.

Coreless Casting

The previously considered adaptor design requires a core to be used in the casting process in order to produce the required internal cavities and re-entrant angles. This increases the cost and complexity of the manufacturing process.

It has been found that provision of the recesses 62 facilitates flow of material through the mould during casting. The casting process is further facilitated by the tapered nature of the adaptor design. It has been found that, as a consequence, it may be possible to cast the adaptor without requiring a core. This can therefore reduce the cost and complexity of the manufacturing process, as well as reducing the weight of the adaptor.

Fan Noise

Generator sets typically include a fan in order to force cooling air through the generator. The fan is typically mounted on the generator shaft, inside the adaptor.

As discussed above, it is necessary to provide openings in the adaptor to allow an operator to bolt the coupling plate to the engine. However the openings may lead to fan noise being transmitted to the exterior, with negative consequences for the working environment.

Figure 12A:
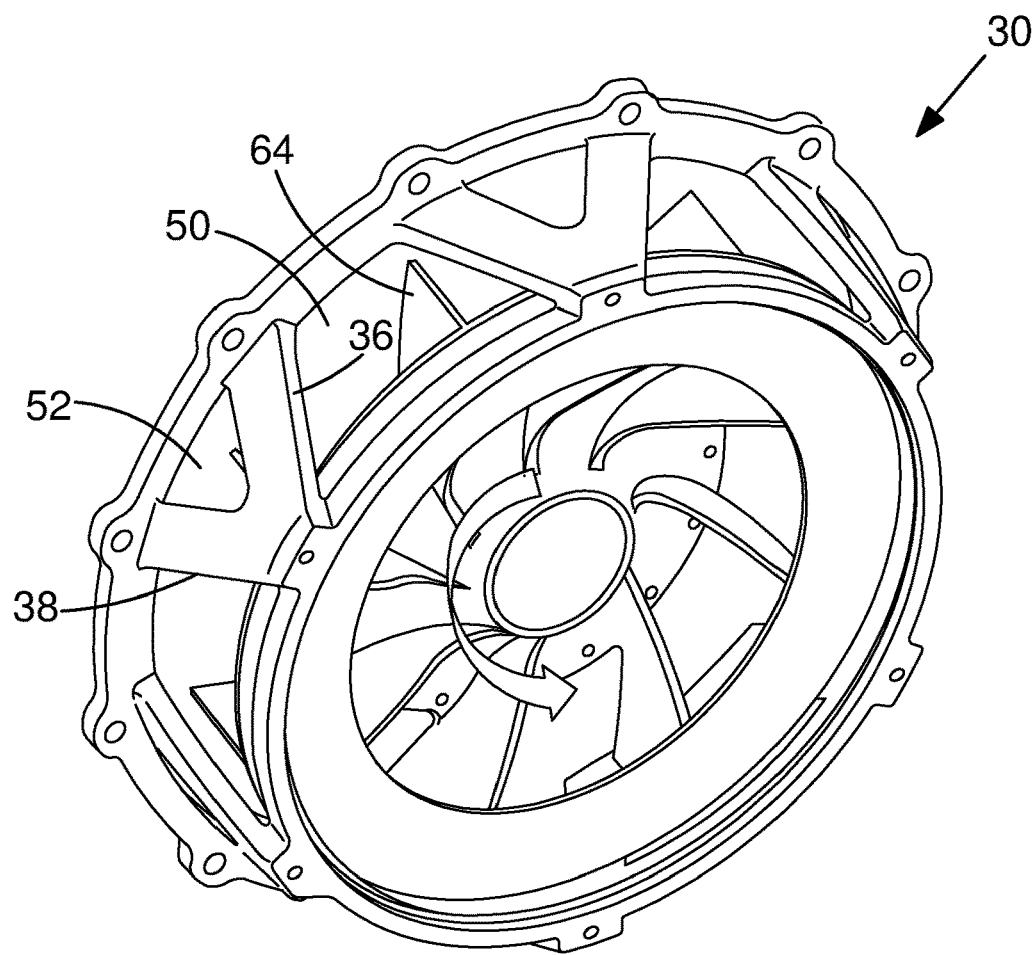
FIGS. 12A and 12B shows the adaptor of FIGS. 4 and 5 with a fan located inside.
Figure 12B:
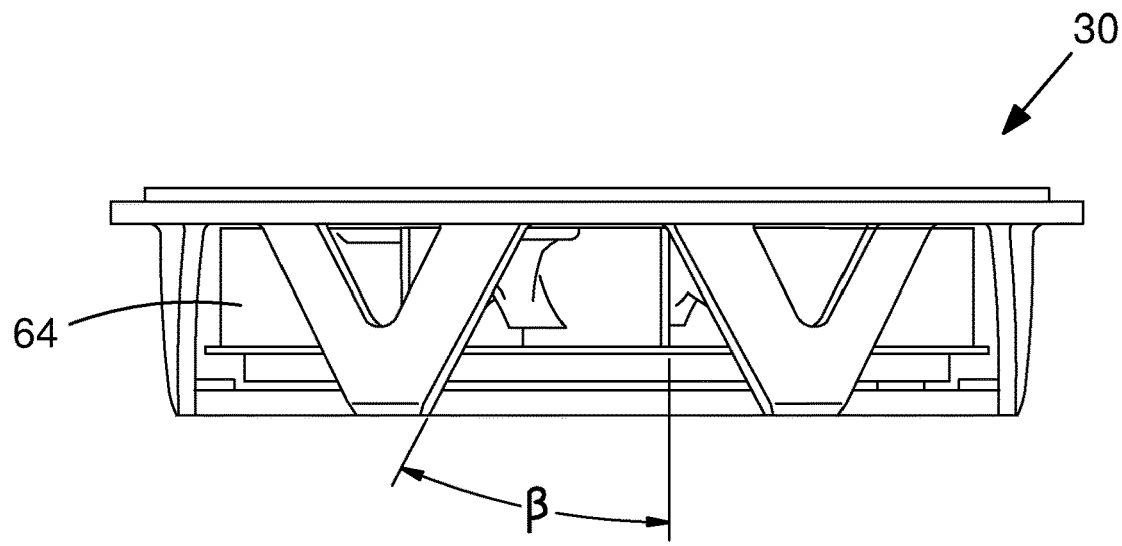

FIGS. 12A and 12B shows the adaptor 30 with a fan 64 located inside. In operation the fan 64 rotates inside the adaptor 30 as shown in FIG. 12A. Rotation of the fan 64 forces air against the cross members 36, 38 and through the openings 50, 52.

In the previously considered adaptor design, the openings in the adaptor present a substantially parallel edge to the blades of the fan. By contrast, the cross members of the present embodiment lie at an angle β to the fan blades, as shown in FIG. 12B. Thus the cross members of the present embodiment present a progressive cutting edge against the fan blades during rotation of the fan. It has been found that the magnitude of the noise generated with this design is less than in the case where the side of the opening is straight and the fan blade cuts it instantaneously.

Thus the V-shaped cross member design of the present embodiment also contributes to lower fan noise, thereby improving the operating environment.

It will be appreciated that embodiments of the invention have been described above by way of example only, and variations in the design are possible. For example, various modifications of the cross member design are possible while still maintaining at least some of the advantages discussed above. In one example, rather than being grouped in pairs, the cross members are spaced apart around the adaptor.

In general, at least some of the advantages of the present invention can be achieved by providing a plurality of angled crossings between the first flange member and the second flange member. The angled crossings can be provided in various different configurations, such as a "bird's nest" configuration, an evenly spaced configuration, a V-shaped configuration, an X-shaped configuration, or any combination thereof, or any other appropriate configuration.

Although embodiments of the invention have been described with reference to a generator set, the present invention may be used with any type of power generation system where it is desired to connect a prime mover to a generator.

The invention claimed is:

1. An adaptor arranged to connect a generator to a prime mover, the adaptor comprising:
a first flange member arranged to connect to the prime mover;
a second flange member arranged to connect to the generator;
a plurality of pairs of cross members which connect the first flange member and the second flange member such that the first flange member and the second flange member are substantially concentric and spaced apart axially, and a first opening between a first cross member and a second cross member of one of the pairs of cross members, wherein a second opening between two pairs of cross members is larger than the first opening, wherein the cross members are angled such that one end of a cross member is offset circumferentially with respect to another end of said cross member, and wherein the pairs of the cross members are V-shaped with one cross member of a pair angled in the opposite direction circumferentially to the other cross member of the pair.

2. An adaptor according to claim 1, wherein the cross members are angled with respect to a line lying parallel with the axis of the generator.

3. An adaptor according to claim 1, wherein the ends of the cross members are adjacent to bolt holes in at least one of the first flange member or the second flange member.

4. An adaptor according to claim 1, wherein a cross member extends between a location adjacent to a bolt hole in the first flange member and a location adjacent to a bolt hole in the second flange member.

5. An adaptor according to claim 1, wherein the cross members of a pair have first ends located adjacent to separate bolt holes in the first flange member, and second ends located adjacent to the same bolt hole in the second flange member.

6. An adaptor according to claim 1, wherein:
the base of the V is adjacent to a bolt hole in the second flange member; and
the ends of the V are adjacent to separate bolt holes in the first flange member.

7. An adaptor according to claim 1, wherein a bolt hole in the second flange member lies circumferentially between two bolt holes in the first flange member.

8. An adaptor according to claim 1, wherein at least one of the first flange member or the second flange member is substantially ring-shaped.

9. An adaptor according to claim 1, wherein at least one of the first flange member or the second flange member comprises protrusions which extend radially outwards from the circumference of the respective flange member, and bolt holes are located in the protrusions.

10. An adaptor according to claim 1, wherein the diameter of the first flange member is larger than the diameter of the second flange member, and wherein the cross members are connected on a radially inwards side of the first flange member and a radially outwards side of the second flange member.

11. An adaptor according to claim 1, wherein the cross members are connected to protrusions which extend radially outwards from the circumference of the second flange member.

12. An adaptor according to claim 1, wherein the first flange member includes a recess between two cross members of a pair.

13. An adaptor according to claim 1, wherein the adaptor is arranged to accommodate a fan, and a cross member presents a progressive cutting edge to the blade of the fan.

14. An adaptor according to claim 1, wherein the adaptor is arranged to be cast without using a core.

15. A power generation system comprising:
a prime mover;
a generator; and
an adaptor comprising
a first flange member connected to the prime mover,
a second flange member connected to the generator,
a plurality of pairs of cross members which connect the first flange member and the second flange member such that the first flange member and the second flange member are substantially concentric and spaced apart axially, and
a first opening between a first cross member and a second cross member of a pair of cross members,
wherein a second opening between two pairs of cross members is larger than the first opening,
wherein the cross members are angled such that one end of a cross member is offset circumferentially with respect to another end of said cross member, and
wherein the pairs of the cross members are V-shaped with one cross member of a pair angled in the opposite direction circumferentially to the other cross member of the pair.

* * * * *